(12) United States Patent
Nakai et al.

(10) Patent No.: US 6,479,960 B2
(45) Date of Patent: Nov. 12, 2002

(54) MACHINE TOOL

(75) Inventors: Satoru Nakai, Tokyo (JP); Takashi Iwasaki, Tokyo (JP); Peter Loennqvist, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/782,159

(22) Filed: Feb. 14, 2001

(65) Prior Publication Data

US 2002/0003415 A1 Jan. 10, 2002

(30) Foreign Application Priority Data

Jul. 10, 2000 (JP) .......................................... 2000-208853

(51) Int. Cl.[7] .............................................. G05B 19/18
(52) U.S. Cl. .................... 318/569; 318/560; 318/568.1; 318/568.12; 318/568.22; 318/570; 318/573; 364/474
(58) Field of Search .......................... 318/568.1, 568.12, 318/569, 570, 573, 568.22, 560; 364/474

(56) References Cited

U.S. PATENT DOCUMENTS 5,323,213 A * 6/1994 Ahn ............................ 355/210
5,568,028 A * 10/1996 Uchiyama et al. ........... 318/566
5,895,182 A * 4/1999 Hayashi et al. .............. 409/137
6,172,354 B1 * 1/2001 Adan et al. .................. 250/221

FOREIGN PATENT DOCUMENTS

| CA | 1 193 709 | 9/1985 | |
| DE | 0 153 746 | 1/1982 | |
| DE | 31 45832 | 9/1982 | |
| JP | 6-155239 | * 3/1994 | ........... B23Q/15/12 |
| JP | 9-323240 | 12/1997 | |
| JP | 11-285910 | * 10/1999 | ........... B23B/49/00 |

OTHER PUBLICATIONS

Kyuma et al.; Nature, vol. 372, No. 6502, All (Nov. 1994).*
Kyuma et al.; *Nature,* vol. 372, No. 6502, pp. 197–198 (Nov. 1994).
Hantel, "Optische Sensorsysteme", Industrie–Anzeiger 66/ 1988, pp. 14–17.

* cited by examiner

*Primary Examiner*—Robert E. Nappi
*Assistant Examiner*—Tyrone Smith
(74) *Attorney, Agent, or Firm*—Leydig Voit & Mayer, Ltd.

(57) ABSTRACT

A machine tool includes a tool (a drill or the like having a diameter of 2 mm or less), a camera (artificial retina chip or the like) which acquires an image of the tool, and an image processor which determines whether the tool is faulty based on the image acquired by the camera.

5 Claims, 15 Drawing Sheets

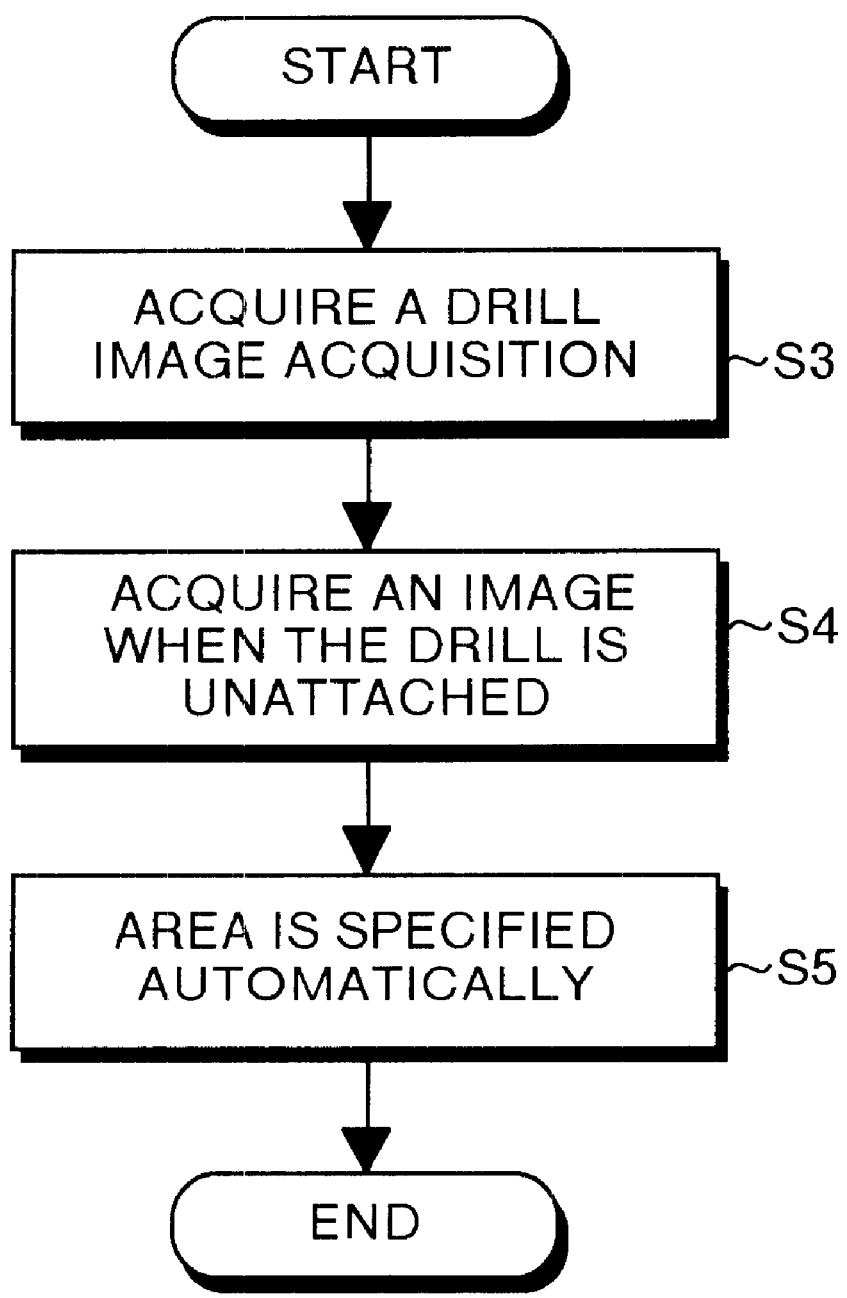

FIG.17

| TOOL NUMBER | 1 | 2 | 3 | 4 | 5 | ... |
|---|---|---|---|---|---|---|
| ... | | | | | | ... |
| MATCHING | IMAGE | EDGE IMAGE | — | — | — | ... |
| TEMPLATE IMAGE | TEMPLATE IMAGE 1 | TEMPLATE IMAGE 2 | — | — | — | ... |
| MATCHING THRESHOLD VALUE | 50 | 30 | — | — | — | ... |
| LONGITUDINAL PROJECTION MATCHING | — | — | IMAGE | — | — | ... |
| TEMPLATE PROJECTION | — | — | TEMPLATE PROJECTION 1 | — | — | ... |
| LONGITUDINAL PROJECTION MATCHING THRESHOLD VALUE | — | — | 20 | — | — | ... |
| TRANSVERSE PROJECTION MATCHING | — | — | IMAGE | — | — | ... |
| TEMPLATE PROJECTION | — | — | TEMPLATE PROJECTION 2 | — | — | ... |
| TRANSVERSE PROJECTION MATCHING THRESHOLD VALUE | — | — | 20 | — | — | ... |
| CENTER OF GRAVITY | — | — | — | IMAGE | EDGE IMAGE | ... |
| GRAVITY CENTER THRESHOLD VALUE | — | — | — | 10 | 10 | ... |
| SPREAD | — | — | — | — | EDGE IMAGE | ... |
| SPREAD THRESHOLD VALUE | — | — | — | — | 40 | ... |

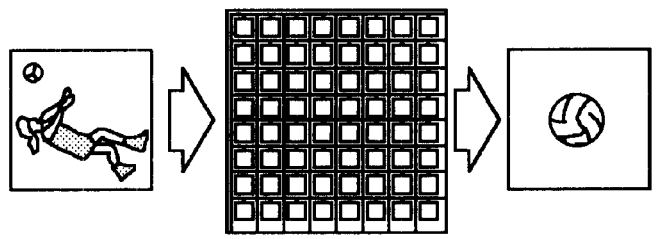
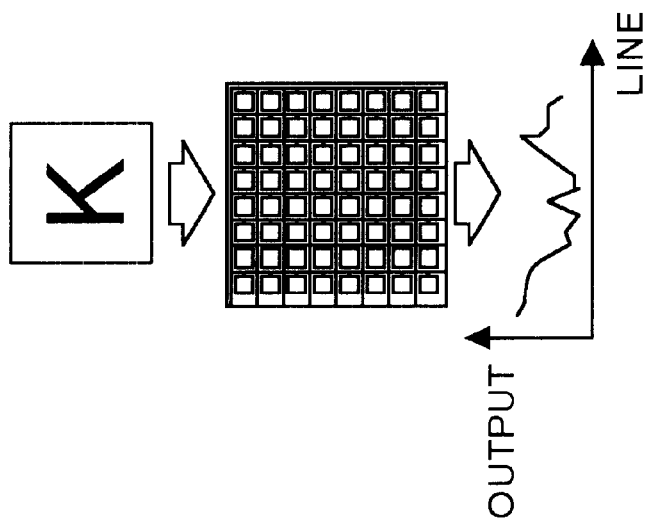
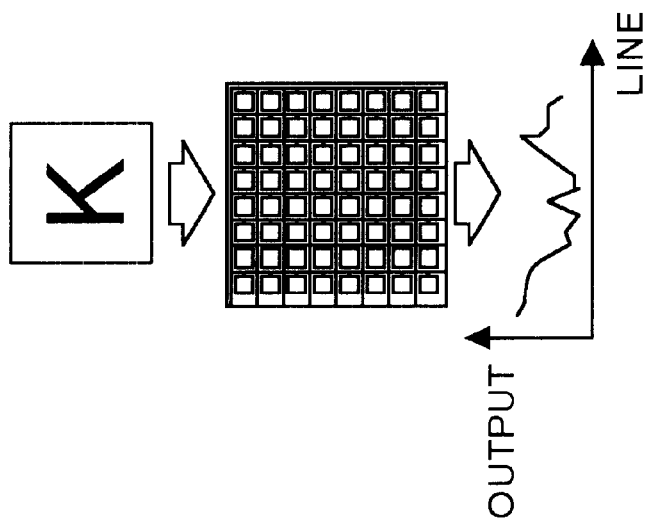
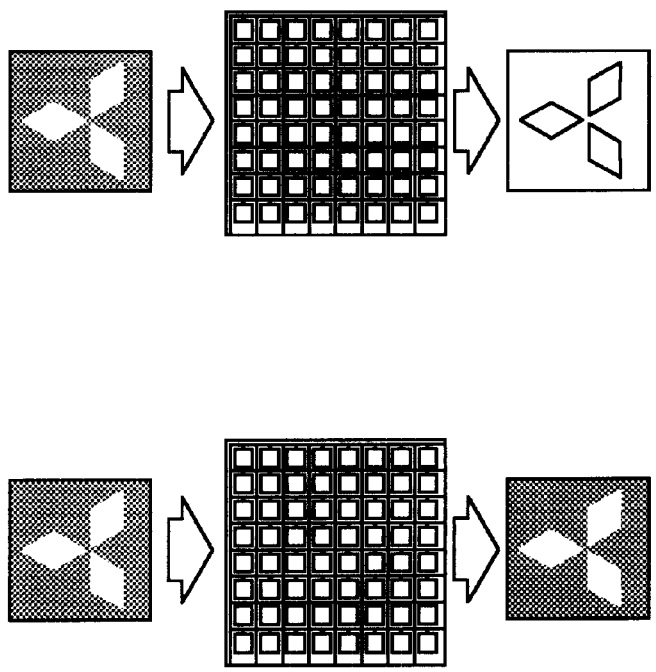

MACHINE TOOL

FIELD OF THE INVENTION

The present invention on in general relates to a machine tool such as turning machine or a machining center. More specifically, this invention relates to a machine tool in which a faulty tool can be identified.

BACKGROUND OF THE INVENTION

In a machine tool, sometimes a tool (e.g., a twist drill) gets broken or damaged, or chips twine around a drill while the matching is repeated many times. Since appropriate working (matching) cannot be continued in this situation, the drill has to be replaced, or chips twining around the drill have to be removed. Whether or not the drill is broken/damaged or whether or not chips twine around the drill can be, for example, confirmed by a human eye. However, in the case of unmanned operation, it is necessary to determine without human help whether or not the drill is broken/damaged or whether or not chips twine around the drill in a machine tool.

For example, a machine tool is known in which a value of the current flowing in a motor which rotates the drill is monitored, and it is detected based on this value whether the drill is faulty. When the drill is normal, it properly cuts the job. In this case, there is a load on the motor, and therefore the current value is large. When the drill is faulty, it does not properly cut the job. In this case, there is less load on the motor, and therefore the current value is small. This numerically controlled (NC) machine tool determines whether or not the drill is faulty based on the difference between the current value when the tool is normal and the current value when the tool is faulty.

In another conventional NC machine tool, a touch sensor is provided which is in contact with a drill. This sensor determines whether or not the drill is faulty. In still another conventional NC machine tool, an image of the drill is photographed by a CCD camera. This image is used to determine whether or not chips twine around the drill.

Thus, in the conventional NC machine tool which detects the faulty tool based on the current value, whether or not the tool is faulty is determined based on the difference between the current value of the normal time and the current value of the breakage/damage time. However, if the cutting load is very small, as in a case in which a tool diameter is 2 mm or smaller (particularly 0.2 mm diameter or less), the difference between the current values when the tool is normal and when the tool is faulty is very small, and it is very difficult to determine whether the tool is normal or faulty.

In the conventional NC machine tool in which the faulty tool is detected using a touch sensor, the touch sensor is in contact with a tool. However, if the strength of the tool is low, as in a case in which the tool diameter is 2 mm or smaller (particularly 0.2 mm diameter or less), the tool gets broken. The tool may be prevented from being broken/damaged by making the travel speed of the touch sensor extremely slow so as to place the sensor in contact with the tool with an extremely minute force. However, the time for determination a tool is broken/damaged is increased, thereby causing a disadvantage that the productivity is markedly reduced With the conventional NC machine tool in which a drill is photographed by a CCD camera, the volume of the CCD camera is large and the camera is expensive. Therefore, there is a problem that the NC machine tool becomes large sized, and its cost increases.

SUMMARY OF THE INVENTION

It is one object of this invention to provide a machine tool in which even when the cutting load is minute and/or the strength of a tool is low, it is possible to automatically determine whether or not the tool is faulty. It is another object of this invention to provide a machine tool in which the machine tool can be miniaturized and thereby cost can be reduced.

The machine tool according to one aspect of the present invention comprises a photographing unit which photographs an image of the tool, and a determination unit which determines whether or not the tool is faulty based on the images obtained by the photographing unit. This, a faulty tool is detected using the images and there is nothing that comes in contact with the tool.

The photographing unit comprises an artificial retina chip. The artificial retina chip is small and inexpensive. Accordingly, the machine tool can be miniaturized, and the cost can be reduced.

Other objects and features of this invention will become apparent from the following description with reference to the accompanying drawings.

BRIEF DESCRIPTION OF THE DRAWINGS

FIG. 12 is a flowchart of another example of the setup processing.

FIG. 17 is a view showing an example of a data table of comparison methods and comparison standards for each tool.

FIG. 21A to FIG. 21D are explanatory views for explaining on-chip image processing of the artificial retina LSI.

DESCRIPTION OF THE PREFERRED EMBODIMENTS

Preferred embodiments of the present invention will be explained in detail below while referring to the attached drawings. The present invention is not limited to these embodiments.

Figure 1:
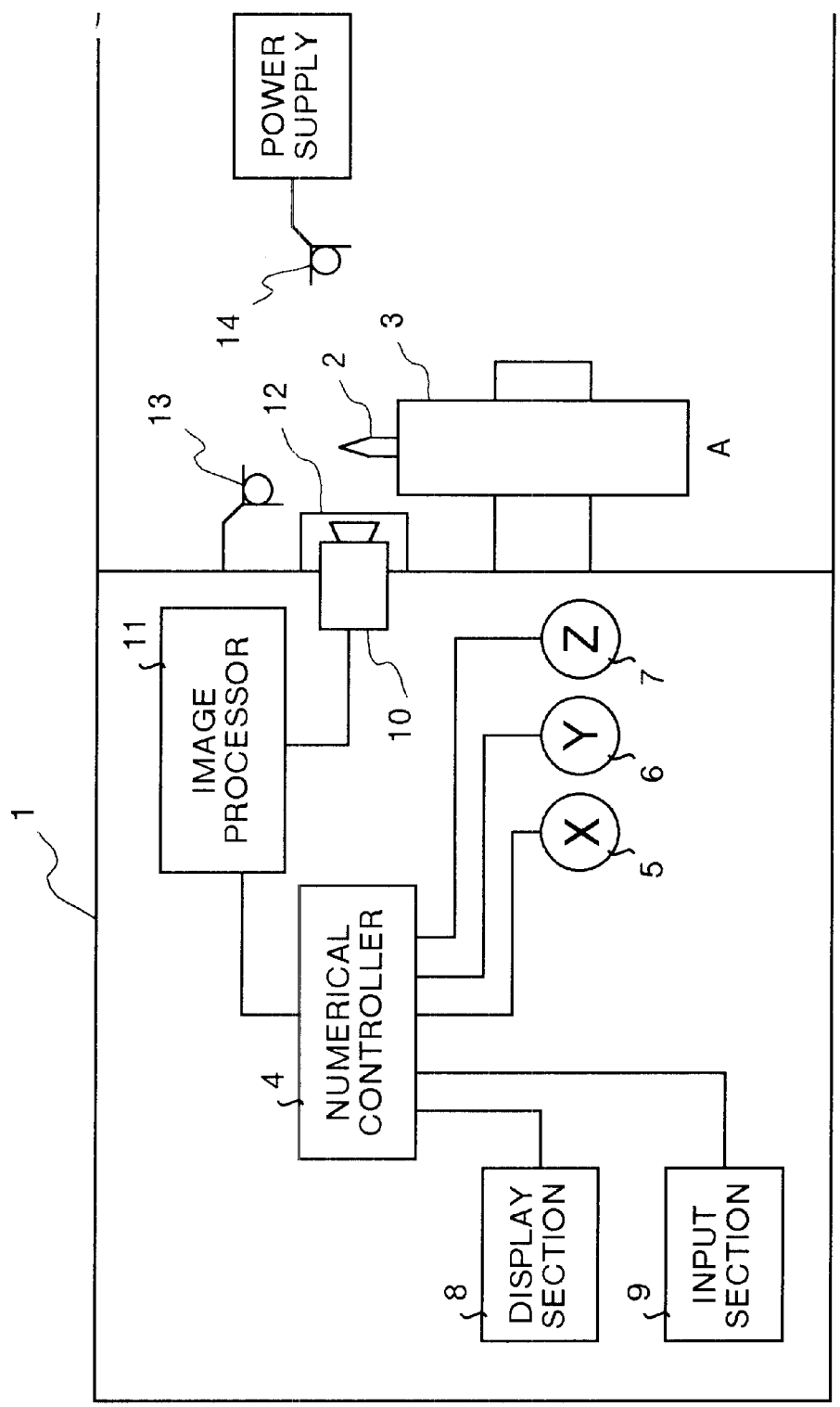
FIG. 1 is a view showing an outline structure of a NC machine tool according to a first embodiment of the present invention.

FIG. 1 shows the outline structure of an NC machine tool according to a first embodiment of the present invention. The NC machine tool 1 comprises a tool (for example, a drill) 2 for working, a hold section (turret) 3 for holding the tool 2, a numerical controller 4 for controlling each section of the NC machine tool 1, servomotors 5, 6, 7 for respectively moving the hold section 3 in three perpendicular directions (X, a Y, and Z), a display section 8 having a CRT (Cathode Ray Tube), an LCD (Liquid Crystal Display), or the like and displaying based on control from the numerical controller 4, an input section 9 having a control panel switch, a keyboard, a touch panel, or the like and for inputting instructions by an operator, a vision sensor (for example, a camera) 10 which photographs an image of the tool 2 (or a position where the tool 2 should be), an image processor 11 which processes the image taken by the camera 10 and determines whether the tool 2 is faulty, a cover 12 which protects the camera 10, and an illumination lamp 13 which lightens the tool 2.

The NC machine tool 1 may be a turning machine or a machining center. However, there is no particular limitation on the type of the machine. The turning machine will be taken as an example here. The tool 2 may have drills of various diameters. There is no particular limitation. A slender drill with a 2 mm diameter or less, particularly with approximately 0.2 mm diameter, will be taken as an example here. The hold section 3 is a turret for holding the drill 2. The turret 3 is rotatable and can change the direction of the drill 2 by 180 degree. The turret 3 turns the drill 2 toward the camera 10 when performing the tool abnormality detection processing described later. The turret 3 turns the drill 2 toward the opposite side ("A" in FIG. 1) to the camera 10 when machining (cutting time). That is, the opposite side of the camera 10 is the working position.

The numerical controller 4 controls the servomotors 5, 6, 7 according to an NC working program stored in advance to move the turret 3, controls the display section 8 so as to perform a predetermined display, receives instructions from a user via the input section 9, and controls the image processor 11 to perform tool abnormality detection processing described later. The servomotors 5, 6, 7 move the turret 3 in the X axis direction, the Y axis direction, and the Z axis direction, respectively. Thus, the turret 3 can be moved three-dimensionally, flexibly.

The display section 8 performs display by means of the CRT, the LCD, or the like. The input section 9 is for inputting instructions from the operator by means of a control panel switch, a keyboard, a touch panel, or the like. The camera 10 is not particularly limited to a specific type, and here, a CCD (Charge Coupled Device) camera is given as an example. The CCD camera 10 photographs the image of the drill 2 (or a position where the tool 2 should be).

The image processor 11 is a high speed image processor, such as a DSP (Digital Signal Processor), an ASIC (Application Specific IC), and the like. This image processor 11 performs image processing to the images taken by the CCD camera 10 and determines whether or not the drill 2 is faulty. That is, whether the drill 2 is broken and or chips are twine around the drill 2. The cover 12 covers the CCD camera 10 and protects it from the chips and coolant liquid spattered during cutting. If the cover 12 is transparent it need not be removed at the time of photography. The cover 12 is removed at the time of photographing, if it is non-transparent.

The illumination lamp 13 is to improve the photographing condition and lights up the drill 2 from the same direction as that of the CCD camera 10. Since the drill 2 is metallic, it will reflect the light well. Therefore, the images will contain a dark background and a bright drill 2. An illumination lamp 14 which lights up the drill 2 from the direction opposite to that of the CCD camera 10 may be provided instead of the illumination lamp 13. In this case, the image will contain a bright background and a dark drill 2. In either case, when the illumination lamp is used, the observation condition (photographing condition) can be stabilized.

Figure 2:
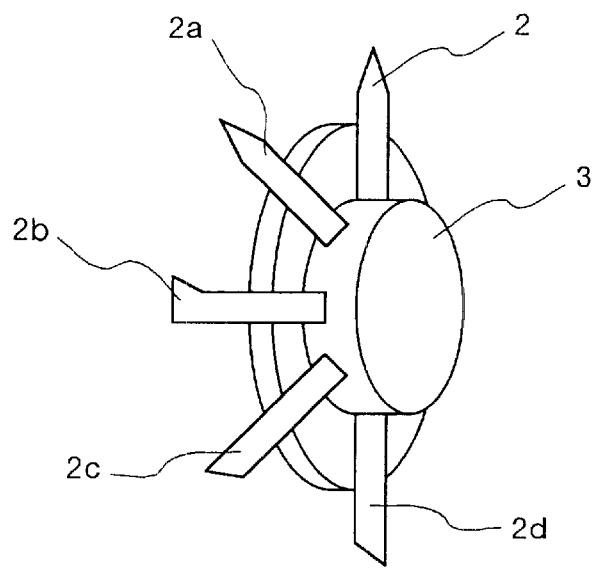
FIG. 2 is a view showing an outline structure of the turret shown in FIG. 1.

FIG. 2 is a view showing an outline structure of the turret 3. A spare drill 2a, tools 2b to 2d, such as cutting tools, as well as the drill 2 are attached to the turret 3. A tool that is to be used can be automatically selected under the control of the numerical controller 4. Here, although a turning machine is given as an example, even in the case of a machining center, automatic exchange of tools can be performed by providing an ATC (Auto Tool Changer) and attaching plural tools.

Figures 3A, 3B:
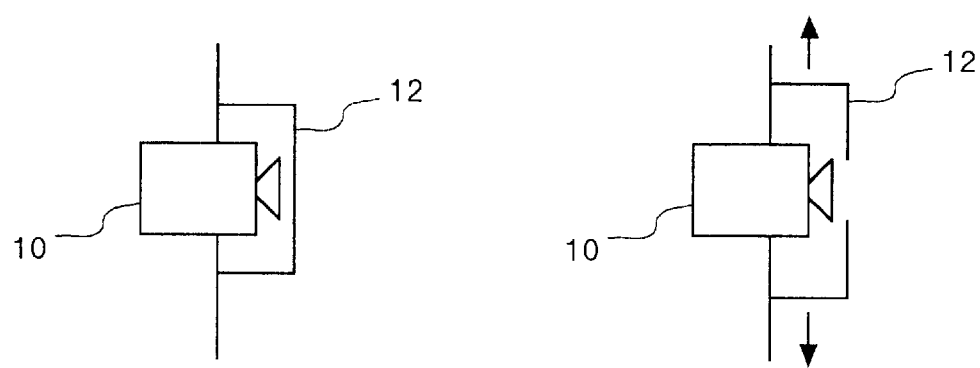
FIG. 3A and FIG. 3B explains a closed cover and FIG. 3B explains opening of the cover.

FIG. 3A and FIG. 3B explain opening/closing of the cover 12. The cover 12, for example, can be driven using a not shown driving motor. The cover 12 is opened or closed under the control of the numerical controller 4. The numerical controller 4 closes the cover 12 as shown in FIG. 3A to protect the CCD camera 10 at the time of working and opens the cover 12 as shown in FIG. 3B when an image is to be taken.

Figure 4A:
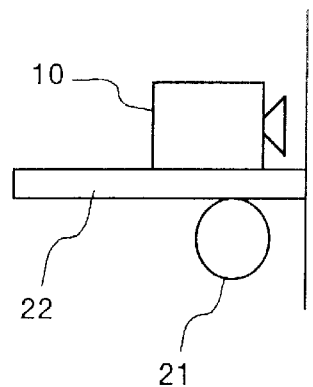
FIG. 4A shows a regular position of the CCD camera and FIG. 4B explains coming-in of the camera.
Figure 4B:
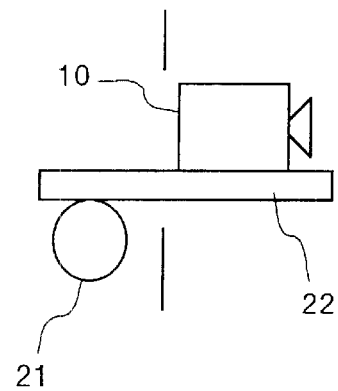

It may happen that there is no space for installing the cover 12 and/or even the CCD camera 10. In this case, the cover 12 may not be provided. Furthermore, the CCD camera 10 may be provided outside and moved-in by means of a coming-in/out mechanism (e.g., a robot arm) 22 as shown in FIG. 4A. The CCD camera 10 may be installed on the robot arm 22, and the camera 10 may stand by at a stand-by position (the situation shown in FIG. 4A) where chips and coolant liquid are not spattered at the time of working. Then, the camera 10 may be moved, to an observation position (photographing position) (the situation shown in FIG. 4B) when an image is to be taken, using the robot arm driving motor 21.

Further, a table that indicates a correspondence between the tools (i.e., tool numbers) and photographing positions of the CCD camera 10 may be prepared and the a photographing position may be decided based on this table. This allows the tools to be appropriately positioned in the visual field of the CCD camera 10 even when many types of tools are employed. A transparent cover (glass, plastic, or the like) may be employed as the cover 12 instead of the opening/closing mechanism of the cover 12 when the cover is transparent it is necessary. Dirt (chips and the like) adhering to the cover 12 may be removed by a cleaning device. On the other hand, if the cover 12 is not provided, dirt adhering to the CCD camera 10 may be removed by a cleaning device.

Figure 5A:
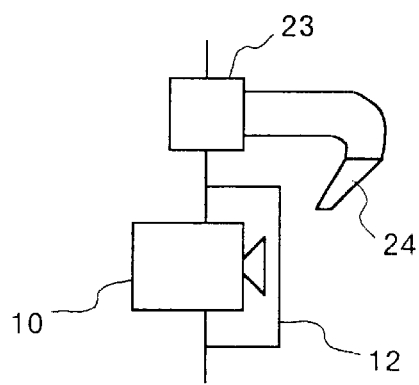
FIG. 5A and FIG. 5B are views showing an outline structure of a cleaning device for cleaning the camera.
Figure 5B:
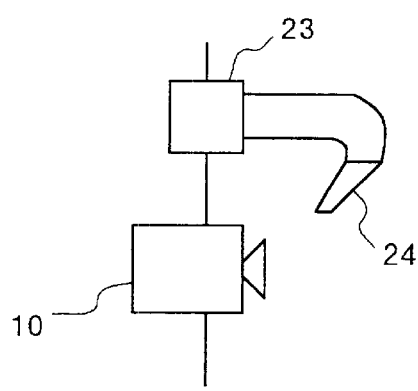

FIG. 5 shows an example of such a cleaning device. As shown in FIG. 5A, the well known air jet device 23 may be used. Air jet nozzle 24 of the air jet device 23 is directed toward the cover 12. The air coming out of the air jet nozzle 24 is directed toward the cover 12 to remove dirt adhering to the cover 12. When the cover 12 is not provided, the air jet nozzle 24 is directed toward the lens of the CCD camera 10.

Figure 6A:
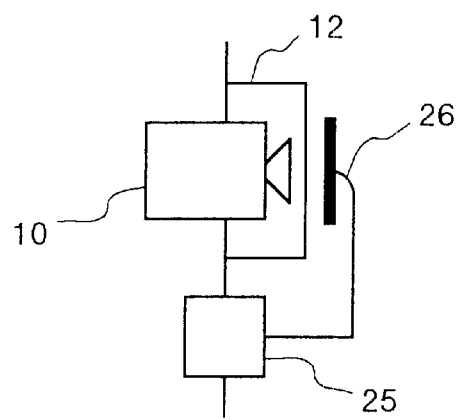
FIG. 6A and FIG. 6B are views showing an outline structure of another cleaning device for cleaning the camera.
Figure 6B:
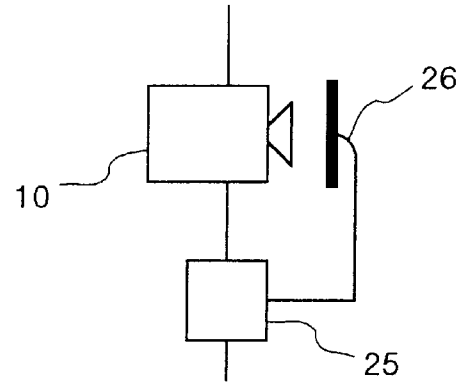

FIG. 6A and FIG. 6B shows an another example of the cleaning device. As shown in FIG. 6A, the well known wiper device 25 may be used. The cover 12 is wiped by a wiper 26. The wiper 26 is driven and the cover 12 is cleaned. When the cover 12 is not provided, the wiper 26 is made to directly clean the lens of the CCD camera 10. Cleaning of the cover or the camera lens is automatically performed under the control of the numerical controller 4 before taking an image.

Figure 7:
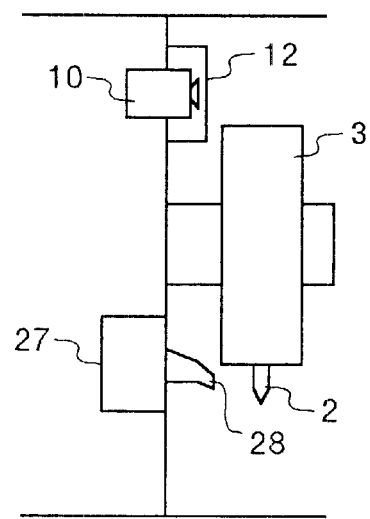
FIG. 7 is a view showing an outline structure of a cleaning device for cleaning the drill.

Further, a cleaning device for cleaning the drill 2 may be provided. FIG. 7 shows an example of such a cleaning device. The well known coolant liquid jet device 27 in which a coolant liquid jet nozzle 28 is directed toward the drill 2 may be used as the cleaning device. The coolant liquid jet nozzle 28 jets the coolant liquid toward the drill 2 and thereby the dirt adhered to the drill 2 is washed away. The device which jets the coolant liquid onto a point on the job (where the cutting or drilling is performed) may as well be utilized to clean the drill.

Figure 8:
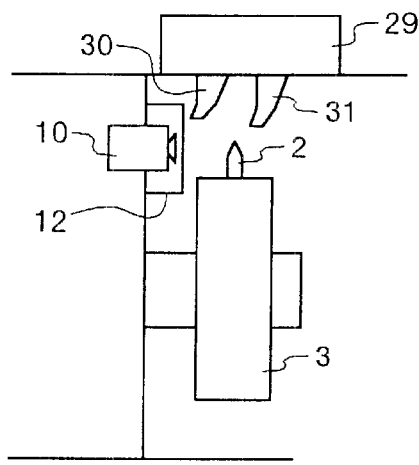
FIG. 8 is a view showing an outline structure of another cleaning device for cleaning the drill.

FIG. 8 shows a still another example of such a cleaning device. In this example, the air jet device 29 has two air jet nozzles 30 and 31. The air jet nozzle 30 is directed toward the cover 12, and the air jet nozzle 31 is directed toward the drill 2. The air from the air jet nozzle 30 is jet toward the cover 12 and thereby the dirt adhered to the cover 12 is washed away. The air from the air jet nozzle 31 is jet toward the drill 2 and thereby the dirt adhered to the drill 2 is washed away.

Figure 9:
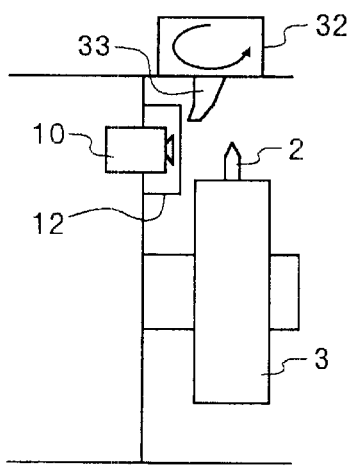
FIG. 9 is a view showing an outline structure of still another cleaning device for cleaning the drill.

FIG. 9 shows still another example of such a cleaning device. This air jet device 32 has one air jet nozzle 33 and it can be rotated so as to be directed toward either the cover 12 or the drill 2. The air jet nozzle 33 is directed toward the cover 12 and thereby the dirt adhered to the cover 12 is washed away. The air jet nozzle 31 is directed toward the drill 2 and thereby the dirt adhered to the drill 2 is washed away.

Such a cleaning of the cover or the drill is automatically performed under the control of the numerical controller 4 prior to taking an image. In the present embodiment, the CCD camera 10 and the cover 12 correspond to the photographing unit, the image processor 11 corresponds to the determination unit, the air jet device 23 and the wiper device 25 correspond to the cleaning unit, and the coolant liquid jet device 27 and the air jet devices 29, 32 correspond to the tool cleaning unit.

Operations of the first embodiment will be explained while referring to FIG. 10 to FIG. 17. The operation can be divided into two major steps of tool abnormality detection processing and setup processing. The tool abnormality detection processing is the processing by which a faulty tool, such as a broken tool or a damaged tool, twining of chips around the tool is determined. The setup processing is the processing by which data employed in the tool abnormality detection processing is generated. The setup processing and the tool abnormality detection processing will be explained in detail below.

Figure 10:
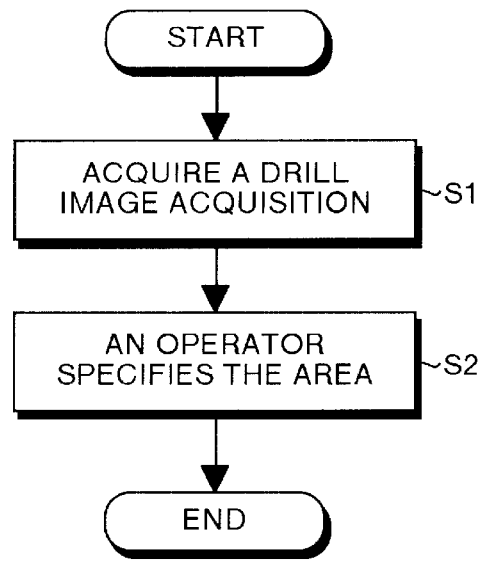
FIG. 10 is a flowchart of setup processing.
Figure 11A:
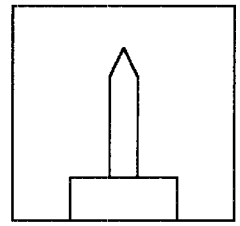
FIG. 11A and FIG. 11B are explanatory views for explaining designation of a drill area by an operator.
Figure 11B:
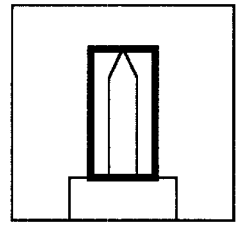

The setup processing is performed prior to starting of work. FIG. 10 is a flowchart which shows the steps in the setup processing. The turret 3 moves the drill 2 to the photographing position and the CCD camera 10 acquires an image of the drill 2 (Step S1). FIG. 11A shows an example of such an image. The numerical controller 4 then orchestrates the display section 8 so as to display the acquired image. An operator operates the input section 9 while watching the displayed image and designates an area (hereafter, drill area) around the drill 2 (Step S2). This area is employed for checking a faulty tool in the tool abnormality detection processing described later. When the are is designates, the image processor 11 cuts only the image in the designated area and stores the image as the image of a normal drill 2. FIG. 11B shows the designated area.

Figure 13A:
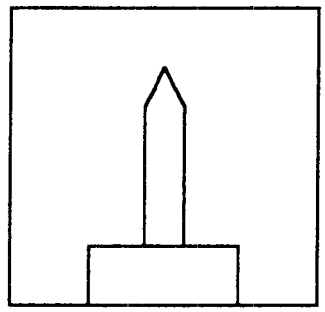
FIG. 13A to FIG. 13C are explanatory views for explaining automatic designation for the drill area.
Figure 13B:
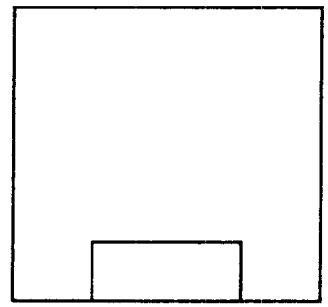
Figure 13C:
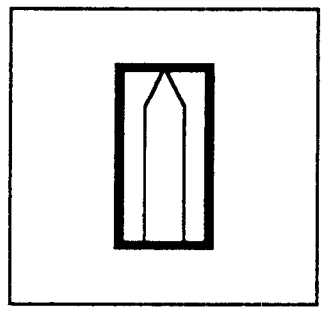

FIG. 12 is a flowchart which shows the steps in an another example of the setup processing. The turret 3 moves the drill 2 to the photographing position and the CCD camera 10 acquires an image of a situation in which the drill 2 is attached (Step S3). FIG. 13A shows an example of such an image. The turret 3 then moves the drill 2 away and the CCD camera 10 acquires the image of a situation in which the drill 2 is present (Step S4). FIG. 13B shows an example of such an image. Finally, the image processor 11 calculates the difference between the images taken in step S3 and step S4 (Step S5). This difference will be the image of the drill 2 as shown in FIG. 13C, and it is stored as the image of a normal drill 2.

It is mentioned above that, in the setup processing, an image of a designated area or a difference image of is stored. However, it is needless to say that the entire image may be stored. However, this will increase the amount of data. If only a part of the image is stored, then the amount of required memory can be reduced and also the cost can be reduced. Furthermore, a raw image may be stored, or the image may be processed in some way before stored. Such processing may include binarization, edge processing, or one dimensional projection. In step S5 in FIG. 12, the difference image may be calculated from raw image or even after processing the image. Furthermore, properties of the image such as the center of gravity (primary moment), a direction (secondary moment), a spread (variance) and the like may be extracted and stored.

Figure 14:
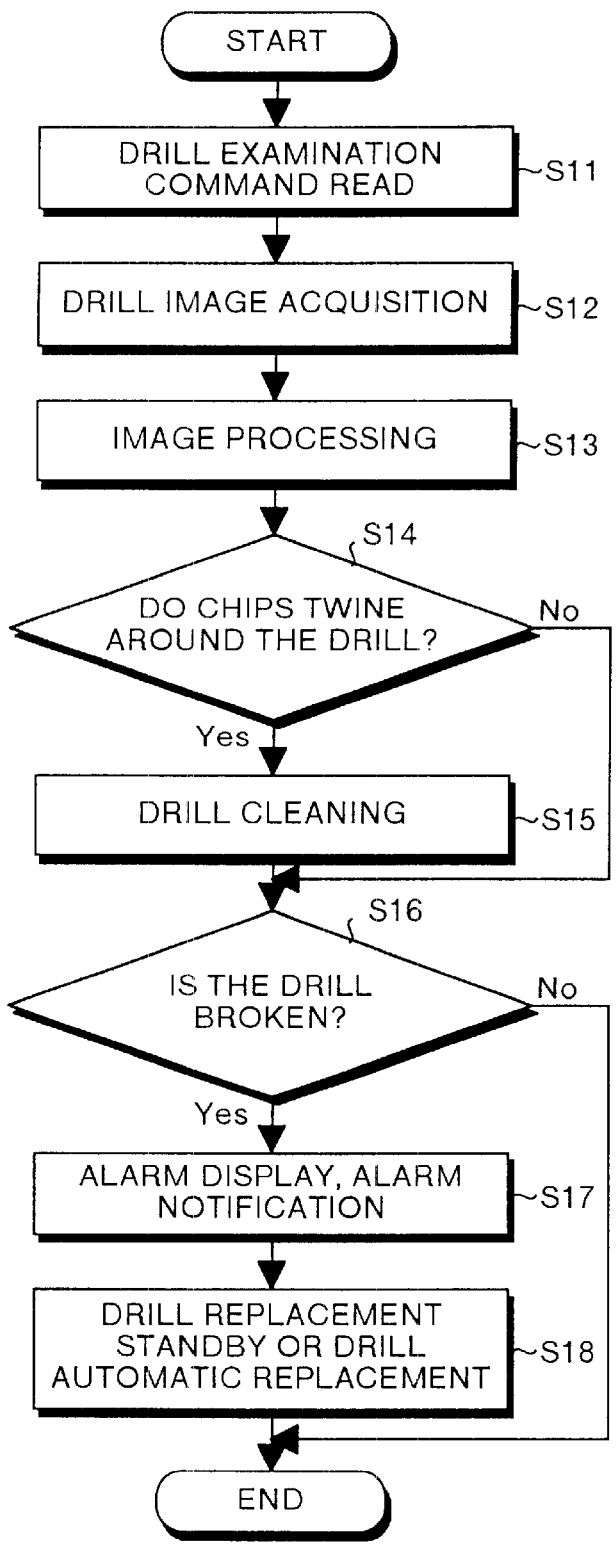
FIG. 14 is a flowchart of tool abnormality detection processing.

FIG. 14 is a flowchart which shows the steps in the tool abnormality detection processing. The tool abnormality detection processing is started when the numerical controller 4 reads a drill examination command in the NC working program (Step S11) This drill examination command is a command which instructs start of the tool abnormality detection processing. The numerical controller 4 orchestrates the CCD camera 10 and the image processor 11 so as to acquire an image of the drill 2.

The CCD camera 10 takes an image of the drill 2 and the surrounding and the image processor 11 acquires only the image of the drill 2 (Step S12). AE (Automatic Exposure) may be performed at the time of photographing, or an AWB (Automatic White Balance) may be performed in the case in which the CCD camera 10 is a color camera.

Determination processing (Step S14, Step S16) described later may be performed using the raw image acquired at step S12, or the determination processing may be performed while performing a predetermined image processing with respect to the image (Step S13). Concretely, image processing, such as binarization, edge processing, or one dimensional projection, is performed. Feature amounts, such as the center of gravity (primary moment) of an image (or an image that is image processed), a direction (secondary moment), a spread (variance) and the like, may be extracted, and the determination processing described later on may be performed, employing these feature amounts.

Then, the image processor 11 compares (matches) the image acquired at step S12 (or the image that is image processed at step S13) with the image stored in the setup processing described above with respect to the drill area to determine whether or not chips twine around the drill 2 (Step S14). When chips do not twine around the drill 2, the control proceeded to step S16. When chips twine around the drill 2, the drill 2 is cleaned (Step S15) with the help of the drill cleaning device described above to proceed to step S16.

At step S16, the image processor 11 compares the image and thereby determines whether or not the drill 2 in the image is faulty. If the determination is performed in a limited area (drill area), the amount of calculations are reduced greatly. The background, i.e. the portion other than the drill area is almost unnecessary for such determination, and therefore can be eliminated. In this case, more appropriate determination can be performed. The image processor 11 informs the numerical controller 4 of the result of the determination at step S16.

When the drill 2 is normal, the numerical controller 4 which has received the notification finishes the tool abnormality detection processing and proceeds to the working for the next work. When the drill 2 is faulty, on the other hand, the numerical controller 4 which has received the notification displays an alarm on an emergency light which is not shown and/or a monitor of the display section 8 to inform the operator of the abnormality. Otherwise, supposing the case in which the operator is not close to the NC machine tool 1, a communication section which is not shown is controlled to inform the operator of the abnormality via Internet, a portable telephone, or the like (Step S17). Then, until the operator changes the drill, standby is performed. Otherwise, supposing the complete unmanned, such as a night continuous running, the drill is automatically replaced with a spare drill which has been attached in advance (Step S18). Here, processing of step S17 may not be performed, and the automatic replacement for the drill may be performed at step S18 to proceed to the working for the next work.

This tool abnormality detection processing may be performed any time. That is, the tool abnormality detection processing may be performed each time one work is worked or may be performed each time plural works are worked. The NC working program is described so that the tool abnormality detection processing is performed after a predetermined number of works are worked. When the tool abnormality detection processing is performed each time N works are worked, "work cutting time+tool abnormality detection processing time/N" becomes the tact time for one work, and there is a possibility that N-1 works are cut by an abnormal tool at the maximum. A user can arbitrarily set the timing to perform the tool abnormality detection processing via the input section 9.

Figure 15A:
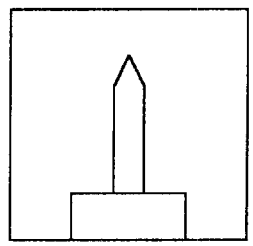
FIG. 15A and FIG. 15B explain the tool abnormality detection processing when the tool is normal.
Figure 15B:
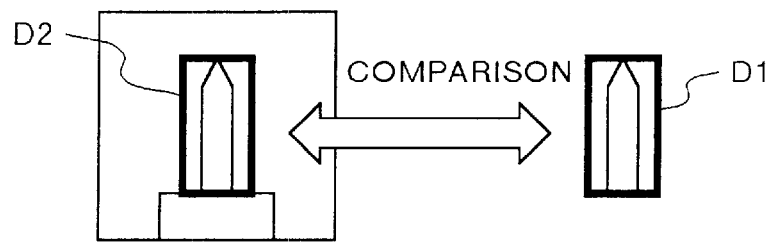

FIG. 15A and FIG. 15B explain the tool abnormality detection processing (when the tool is normal). FIG. 15A shows the photographed image. FIG. 15B shows an image D2 of the drill area which is extracted from the photographed image. The image D2 is compared with an image D1 which is stored before hand in the setup processing. It is determined whether or not the drill 2 is broken or whether or not the chips twine around the drill 2 based on whether or not those images difference is within a predetermined allowable range. As shown in FIG. 15B, there is almost no difference between the image D1 and D2 (i.e. the difference is within the predetermined allowable range). Therefore, it is determined that the drill 2 is normal.

Figure 16A:
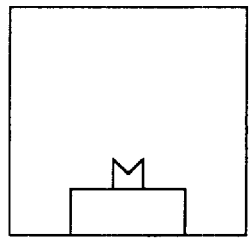
FIG. 16A and FIG. 16B explain the tool abnormality detection processing when the tool is faulty.
Figure 16B:
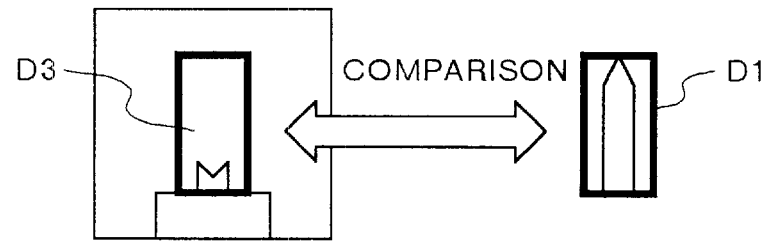

FIG. 16A and FIG. 16B explain the tool abnormality detection processing (when the tool is faulty). FIG. 16A shows the photographed image. FIG. 16B shows an image D3 of the drill area which is extracted from the photographed image. The image D3 is compared with the image D1 which is stored before hand in the setup processing. In this case, the difference between the images D1 and D3 will be outside the allowable range. Therefore, it is determined that the drill 2 is faulty.

Here, the images D1, D2 (D3) may be binarized and compared to perform determination. Since an binary image (binarized image) shows an area of an image, the image becomes robust relative to changes in brightness or the like by performing binarization, employing an appropriate threshold value calculated from a histogram of images (e.g., a threshold value calculated by a mode method). Thus, even when an observation condition is changed to a certain extent, a stable appropriate comparison determination can be performed by employing the binary images.

The images D1, D2 (D3) may be edge processed and compared to perform determination. Since an edge image (edge processed image) shows the structure of an image, the image is robust relative to changes in brightness or the like. Thus, even when an observation condition is changed to a certain extent, a stable appropriate determination can be performed by employing the edge images. A two dimensional edge image may be employed or a one dimensional edge image may be employed as the edge image. A calculation amount can be reduced by employing the one dimensional edge images, compared with the case in which the two dimensional edge images are employed. With respect to a drill, appropriate comparison determination can be performed fully even for the one dimensional edge images of only the longitudinal direction.

Projections of the axis of ordinate and the axis of abscissa of the images D1, D2 (D3) (or edge images) in the drill area may be compared (matching) without comparing the entire images D1, D2 (D3) in the drill area. Feature amounts, such as the center of gravity (primary moment), a direction (secondary moment), a spread (variance), and the like of the images D1, D2 (D3) (or the edge images) in the drill area, may be compared, and comparison may be performed in appropriately combining these feature amounts.

Further, a comparison standard (threshold value or the like for determination) and/or a comparison method (what type of image processing is performed or the like) in the tool abnormality detection processing may be altered according to the types of an employed tool (diameter, material, shape, and the like of a drill). For example, when the diameter of a drill is small, the threshold value for determination may be altered according to the diameter of the drill, considering that the probability that the drill is broken at the root becomes high. A data table of comparison methods and comparison standards for each tool may be provided so as to perform comparison determination based on this data table. FIG. 17 is a view showing an example of a data table of comparison methods and comparison standards for each tool. In this data table, the comparison standards and the comparison methods are stored, corresponding to tool numbers for identifying each tool uniquely that are attached to the NC machine tool 1.

For example, in breakage/damage detection for the tool with tool number 1, a template image 1 stored in advance and the image of the tool being a detection object are compared without performing image processing. If the difference exceeds a predetermined threshold value ("50" in FIG. 17) as a result of that comparison, it is determined that the tool is broken/damaged. In breakage/damage detection for the tool with tool number 5, the image of the tool being the detection object is edge processed, and the center of gravity and the spread of the edge processed image are calculated. When the center of gravity and the spread exceed predetermined threshold values ("10," "40" in FIG. 17), it is determined that the tool is broken/damaged.

As described above, according to the first embodiment 1, the CCD camera 10 photographs the image of the drill 2, and the image processor 11 determines whether or not the drill 2 is faulty based on the images that the CCD camera 10 has photographed. Since a faulty drill is checked using images, and there is nothing that makes a contact with the drill 2, it can be automatically determined whether or not the drill 2 is faulty without damaging the drill 2, and appropriate working processing can be performed.

Since a slender drill 2 whose diameter is 2 mm or less (particularly 0.2 mm or less) is employed as the tool, detailed working can be performed. Since the image processor 11 determines whether or not the tool is broken/damaged, employing a threshold value in accordance with the type of the tool, appropriate determination in accordance with the type of the tool can be performed. Since the image processor 11 performs image processing for the image that the CCD camera 10 has photographed in accordance with the type of the tool and determines whether or not the tool is broken/damaged based on the image to which image processing is applied, appropriate determination in accordance with the type of the tool can be performed.

The image processor 11 performs edge processing of the image that the CCD camera 10 has photographed and determines whether or not the tool is broken/damaged based on the images to which edge processing is applied. This allows stable determination to be performed relative to changes in a photographing condition, such as brightness. Since the drill 2 is cleaned by means of the coolant liquid jet device 27 or the air jet device 29, 32 before the CCD camera 10 photographs, appropriate photographing can be performed by the cleaning even when chips and the like adhere to the drill 2.

Since the CCD camera 10 is cleaned by means of the air jet device 23 or the wiper device 25 before the CCD camera 10 photographs, appropriate photographing can be performed by the cleaning even when chips and the like adhere to the cover 12 and the CCD camera 10. Since the image processor 11 determines whether or not chips twine around the drill 2 based on the images that the CCD camera 10 photographs, it is automatically determined whether or not chips twine around the drill 2, and more appropriate working processing can be performed.

Figure 18:
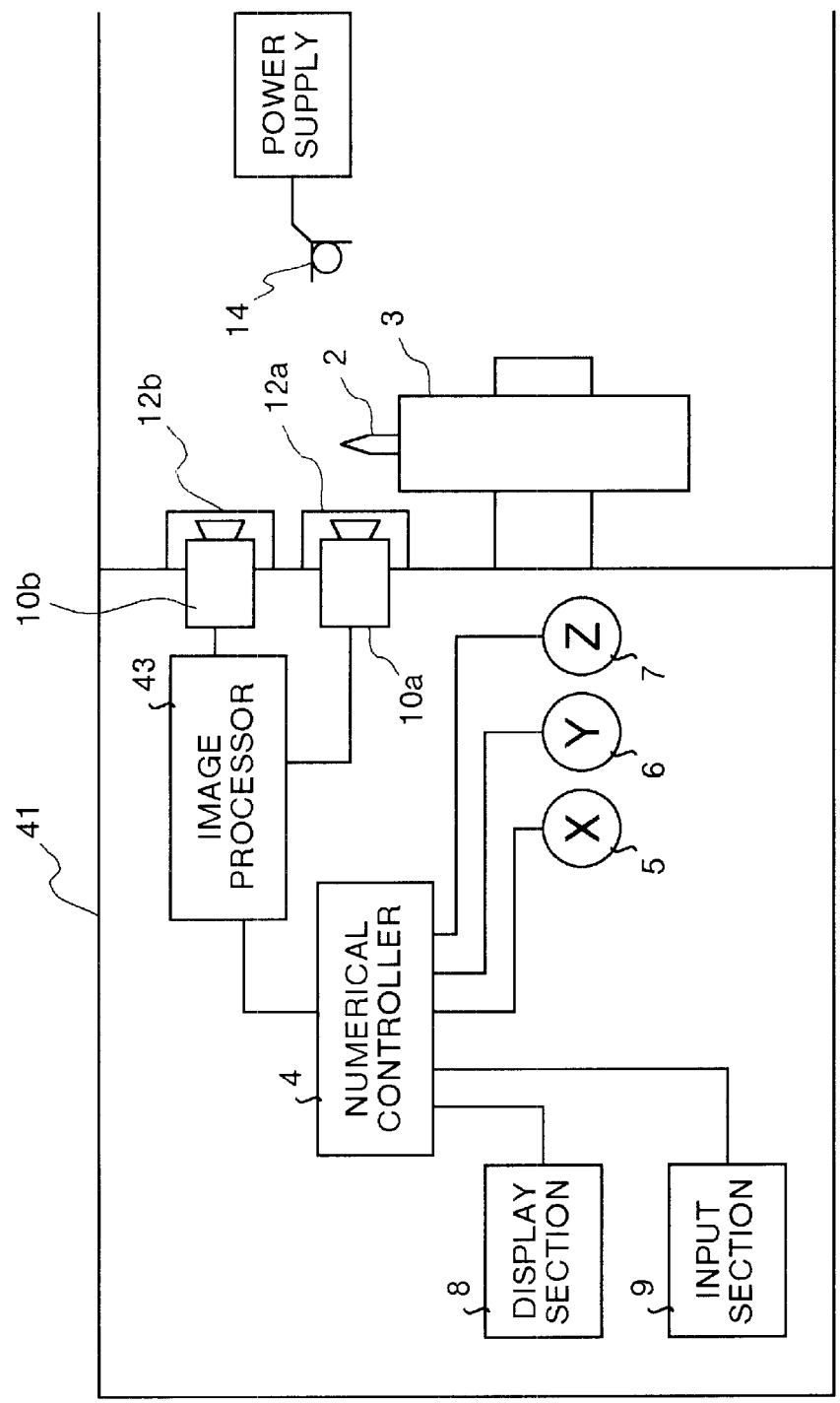
FIG. 18 is a view showing an outline structure of a NC machine tool according to a second embodiment of the present invention.

A second embodiment of the present invention will now be explained. In this second embodiment, a plurality of cameras are provided so as to acquire a stereo image of the drill 2. FIG. 18 is a view showing an outline structure of an NC machine tool according to the second embodiment. Since the basic structure is similar to that of the first embodiment, same legends are provided to the same structural sections.

The NC machine tool 41 is provided with a plurality of cameras 10a, 10b and covers 12a, 12b instead of the one camera 10 and the one cover 12 in the NC machine tool 1 of the first embodiment. An image processor 43 is provided for processing a plurality of images from the camera 10a, 10b instead of the image processor 11. The respective camera 10a, 10b have similar structures to that of the camera 10 of Embodiment 1 and photograph images of the drill 2 from two distinct positions.

The image processor 43 has similar structure to that of the image processor 11 of the first embodiment and inputs the plurality of images from the camera 10a, 10b to perform the tool abnormality detection processing through stereo viewing. In the stereo viewing, distance information from the cameras 10a, 10b to an observation object can be obtained by seeking a corresponding point from the two images photographed by the two cameras 10a, 10b. The image processor 43 determines that the drill 2 is normal when the drill 2 is on a position where it should be and determines that the drill 2 is faulty when the drill 2 is not on a position where it should be.

Operation in the second embodiment will be explained. The operation is similar to that in the first embodiment except that in the setup processing shown in FIG. 10 and FIG. 12, the respective cameras 10a, 10b acquire images at steps S1, S3, and the image processor 43 calculates the distance to the drill 2 to store it. In the tool abnormality detection processing shown in FIG. 14, the respective cameras 10a, 10b acquire images at step S12, and the image processor 43 calculates the distance to the observation object to compare it with the distance to the drill 2 stored at step S16.

Since the distance information of the observation object obtained by stereo viewing does not depend on the photographing condition, such as brightness, robust determination can be performed relative to changes in the photographing condition by regarding the distance information by the stereo viewing as the standard for determination. In the distance calculation, edge processing may be first applied to the images from the cameras 10a, 10b, and then the distance calculation may be performed, employing the images that are edge processed. With this, further robust determination processing can be performed. This edge processing may be primary edge processing or may be secondary edge processing.

As described above, with the second embodiment, the image processor 43 determines whether or not the drill 2 is faulty by the stereo viewing based on the plural images that the plural CCD cameras 10a, 10b have photographed. This allows the distance to the observation object to be determined, and thus stable determination can be performed relative to changes in the photographing condition, such as brightness.

Figure 19:
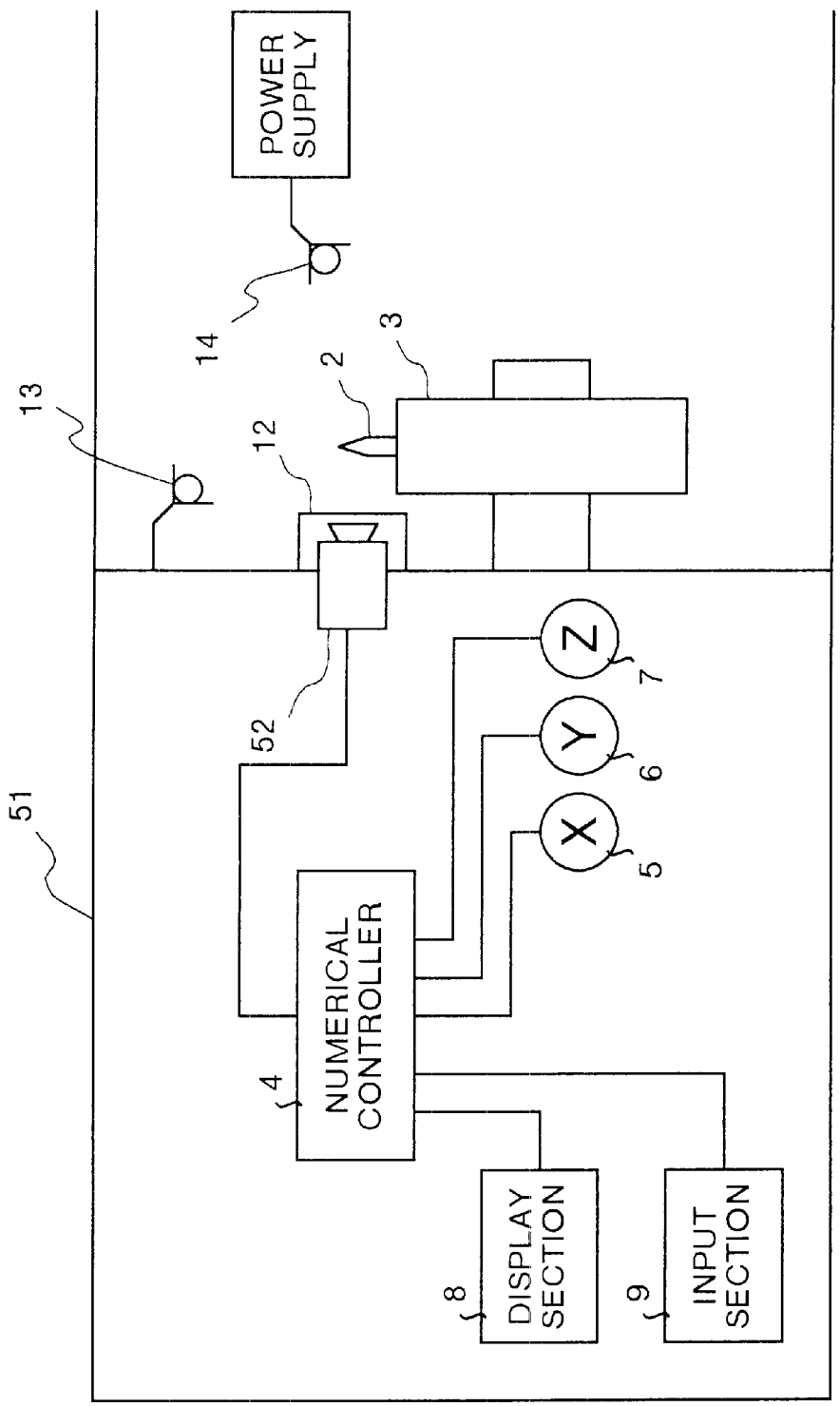
FIG. 19 is a view showing an outline structure of a NC machine tool according to a third embodiment of the present invention.

A third embodiment of the present invention will now be explained. In this third embodiment, an artificial retina chip is employed to photograph an image. FIG. 19 is a view showing an outline structure of an NC machine tool according to the third embodiment. The basic structure is similar to that in the first embodiment, and therefore same legends are attached to the same sections as those in FIG. 1.

Figure 20:
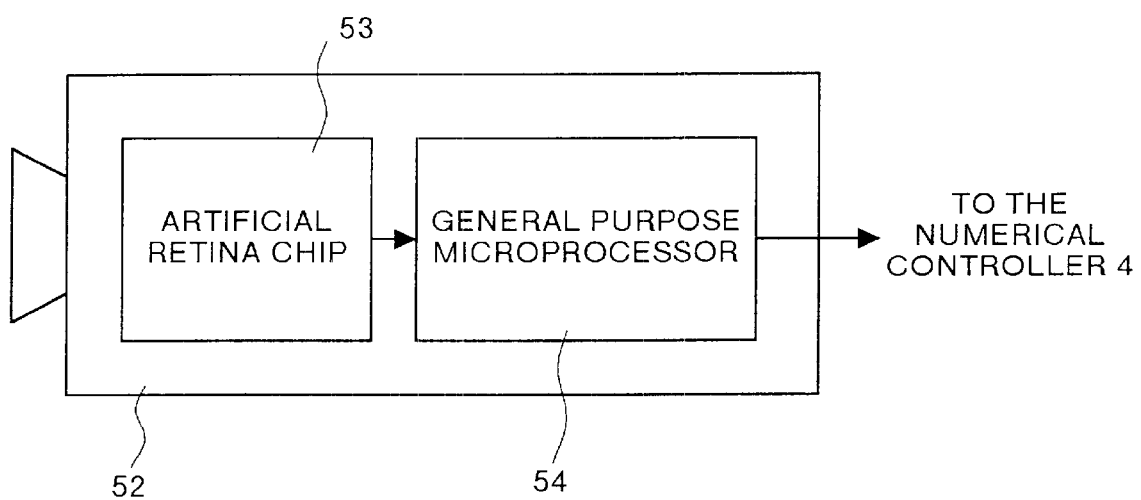
FIG. 20 is a view showing an outline structure of the artificial retina camera shown in FIG. 19.

The NC machine tool 51 is provided with an artificial retina camera 52 instead of the CCD cameras 10 and the image processor 11 in the NC machine tool 1 of the first embodiment. FIG. 20 is a view showing an outline structure of the artificial retina camera 52. The artificial retina camera 52 is provided with an artificial retina chip 53 which takes a photographs and performing feature extraction processing (image processing) of the image photographed, and a general purpose microprocessor 54 which determines whether or not the drill 2 is broken/damaged or whether or not the chips twine around the drill 2 based on the image from the artificial retina chip 53.

The artificial retina chip 53 is small, inexpensive and has a low electric power consumption. Accordingly, the artificial retina chip 53 can be used even when there is little space to spare in the machine tool. The chip 53 is particularly effective when a plurality of cameras are provided as in the second embodiment. That is, even in the case in which there is little space to spare in the machine tool, a plurality of artificial retina chips may be provided to perform stereo viewing, and increase in cost can be restrained.

The artificial retina chip 53 can perform photographing of an image and feature extraction processing (image processing) of the image photographed. That is, feature extraction processing (image processing) of an image among processing that the image processing section (high speed image processor) 11 performs in Embodiment 1 can be performed in the camera side. This allows a simple general purpose microprocessor 54 to perform remaining determination processing and drill area designation processing. The display section 8, the input section 9, the numerical controller 4, and the general purpose microprocessor 54 correspond to designation means of the present invention, and the general purpose microprocessor 54 corresponds to artificial retina control means of the present invention.

Operations of the third embodiment will be explained while referring to FIG. 21A to FIG. 21D. FIG. 21 is explanatory views for explaining on-chip image processing of the artificial retina LSI (artificial retina chip) 53. This artificial retina chip 53 can be used to perform the image detection as shown in FIG. 21A, edge processing (one dimensional edge processing, two dimensional edge processing) as shown in FIG. 21B. Or image processing, such as projection from two dimensions to one dimension as shown in FIG. 21C. Since the latter processor can directly acquire an edge image and/or a projected image by performing edge processing and/or projection in the artificial retina chip 53, the calculation amount of the latter processor and the memory using amount can be reduced.

The artificial retina chip 53 can perform random access in which only the data in the designated area can be outputted as shown in FIG. 21D. This random access allows only the image in the drill area to be transferred from the artificial retina chip 53 to the general purpose microprocessor 54. That is, the drill area is designated by an operator or the general purpose microprocessor 54 as explained in the first embodiment, and the general purpose microprocessor 54 controls the artificial retina chip 53 so that only the data in the drill area are outputted. With this, the data amount to be transferred and the memory using amount can be reduced.

Since the artificial retina chip 53 outputs feature amounts of images (image information that is intelligently compressed), it is not necessary to employ a high speed data transfer path as in the case of the CCD camera. Since processing amount of the latter processor is reduced, an inexpensive microcomputer (general purpose microprocessor) 54 can be employed as the latter processor. Other operations are similar to those in the first and second embodiment.

As described above, with the third embodiment, since photographing is performed by means of the small sized, inexpensive artificial retina chip 53, the machine tool 51 can be miniaturized, and the cost can be reduced. Since a part of area in the photographing area of the artificial retina chip 53 is designated by an operator via the input section 9 or automatically by the general purpose microprocessor 54 and the general purpose microprocessor 54 outputs only the data related to the image of the designated area from the artificial retina chip 53, only the part necessary for determination can be designated, and the data amount and the calculation amount can be reduced. Further, the cost can be reduced.

With next invention, the photographing unit has an artificial retina chip and photographs an image of the tool, and the determination unit determines whether or not chips twine around the tool based on the images that the photographing means photographs. Thus, it can be automatically determined whether or not chips twine around the tool, and appropriate working processing can be performed while miniaturizing the machine tool and reducing the cost. Further, since artificial retina chip is small, inexpensive, the machine tool can be miniaturized, and the cost can be reduced.

Further, the designation unit designates a part of area in the image, and a faulty tool is determined based on the image in this limited area. Thus, the amount of data for storage and for the calculation can be reduced.

Although the invention has been described with respect to a specific embodiment for a complete and clear disclosure, the appended claims are not to be thus limited but are to be construed as embodying all modifications and alternative constructions that may occur to one skilled in the art which fairly fall within the basic teaching herein set forth.

What is claimed is:

1. A machine tool comprising:

a plurality of tools for working an object, one of said plurality of tools being employed in working the object;

a photographing unit including an artificial retina chip which acquires an image of said tool employed in working the object and processes the image acquired; and a determination unit which determines whether said tool is faulty based on the image acquired and processed by said photographing unit, wherein said determination unit includes a respective table for each type of said plurality of tools, each table describing areas of an image acquired, with respect to the type of tool, for determining whether said tool of the acquired image is faulty, feature extraction processing to be performed by said photographing unit, and determination processing to be performed by said determination unit, including threshold values used in the determination processing for determining whether said tool of the acquired image is faulty, said determination unit instructs said photographing unit regarding processing of the image acquired of said tool with respect to the areas of the image acquired and features for the feature extraction processing, and said photographing unit outputs the image acquired of said tool to said determination unit, in a compressed format, after the feature extraction processing of the areas specified in the corresponding table stored in said determination unit.

2. The machine tool according to claim 1, wherein said tool is a drill having a diameter not exceeding 0.2 mm.

3. The machine tool according to claim 2, further comprising a photographing unit cleaning unit which cleans said photographing unit before said photographing unit acquires the image.

4. A machine tool comprising:

a plurality of tools for working an object, one of said plurality of tools being employed in working the object;

a plurality of photographing units which acquire respective images of said tool employed in working the object, each of said photographing units having an artificial retina chip which acquires one of the respective images of said tool, said plurality of photographing units producing a stereo image of said tool from the respective images; and a determination unit which determines whether said tool is faulty based on the stereo image produced by said plurality photographing units, wherein said determination unit includes a respective table for each type of said plurality of tools, each table describing areas of an image acquired, with respect to the type of tool, for determining whether said tool of the acquired stereo image is faulty, feature extraction processing to be performed by said photographing unit, and determination processing to be performed by said determination unit, including threshold values used in the determination processing for determining whether said tool of the acquired stereo image is faulty, said determination unit instructs said photographing unit regarding processing of the stereo image acquired of said tool with respect to the areas of the stereo image acquired and features for the feature extraction processing, and said photographing unit outputs the stereo image acquired of said tool to said determination unit, in a compressed format, after the feature extraction processing of the areas specified in the corresponding table stored in said determination unit.

5. A machine tool comprising:

a plurality of tools for working an object, one of said plurality of tools being employed in working the object;

a photographing unit including an artificial retina chip which acquires an image of said tool employed in working the object and processes the image acquired;

a tool cleaning unit which cleans said tool before said photographing unit acquires the image of said tool; and a determination unit which determines whether chips produced by working of the object by said tool are twined around said tool based on the image acquired and processed by said photographing unit, wherein said determination unit includes a respective table for each type of said plurality of tools, each table describing areas of an image acquired, with respect to the type of tool, for determining whether said tool of the acquired image is faulty, feature extraction processing to be performed by said photographing unit, and determination processing to be performed by said determination unit, including threshold values used in the determination processing for determining whether said tool of the acquired image is faulty, said determination unit instructs said photographing unit regarding processing of the image acquired of said tool with respect to the areas of the image acquired and features for the feature extraction processing, and said photographing unit outputs the image acquired of said tool to said determination unit, in a compressed format, after the feature extraction processing of the areas specified in the corresponding table stored in said determination unit.

* * * * *